(12) United States Patent
Watanabe et al.

(10) Patent No.: US 7,984,296 B2
(45) Date of Patent: Jul. 19, 2011

(54) CONTENT PROTECTION DEVICE AND CONTENT PROTECTION METHOD

(75) Inventors: Keiko Watanabe, Fuchu (JP); Jun Sato, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/751,859

(22) Filed: Mar. 31, 2010

(65) Prior Publication Data

US 2010/0250934 A1 Sep. 30, 2010

(30) Foreign Application Priority Data

Mar. 31, 2009 (JP) ................................ 2009-085881

(51) Int. Cl.
*H04L 29/00* (2006.01)
(52) U.S. Cl. ......... 713/168; 713/165; 713/166; 713/167
(58) Field of Classification Search ........... 713/165–168
See application file for complete search history.

(56) References Cited

U.S. PATENT DOCUMENTS

| 6,865,431 | B1 | 3/2005 | Hirota et al. |
| 2004/0049648 | A1 | 3/2004 | Sato et al. |
| 2006/0059375 | A1 | 3/2006 | Ooshima et al. |
| 2007/0160209 | A1 | 7/2007 | Kasahara et al. |
| 2007/0223705 | A1 | 9/2007 | Kasahara et al. |
| 2007/0226399 | A1 | 9/2007 | So et al. |
| 2007/0300078 | A1 | 12/2007 | Ochi et al. |
| 2009/0147960 | A1 | 6/2009 | Maeda et al. |

FOREIGN PATENT DOCUMENTS

| JP | 2004-30586 A | 1/2004 |
| JP | 2004-524634 A | 8/2004 |
| JP | 2006-14035 A | 1/2006 |
| JP | 2006-018335 A | 1/2006 |
| JP | 2006-20154 A | 1/2006 |
| JP | 2006-031519 A | 2/2006 |
| JP | 2006-041737 A | 2/2006 |
| JP | 2006-065503 A | 3/2006 |
| JP | 2006-79449 A | 3/2006 |
| JP | 2007-052633 A | 3/2007 |
| JP | 2008-269088 A | 11/2008 |
| WO | WO 02/084526 A2 | 10/2002 |
| WO | WO 2006/004113 A1 | 1/2006 |
| WO | WO 2007/119324 A1 | 10/2007 |

OTHER PUBLICATIONS

Nakano et al., "SDconnect Digital Rights Management System Technology Using SD Memory Card," Toshiba Review, Toshiba Corporation, Jul. 1, 2008, vol. 63, No. 7, pp. 31-34, Japan.

Notice of Reasons for Rejection mailed by Japan Patent Office on Jul. 6, 2010 in the corresponding Japanese patent application No. 2009-085881.

*Primary Examiner* — Nasser Moazzami
*Assistant Examiner* — Ghazal Shehni
(74) *Attorney, Agent, or Firm* — Knobbe, Martens, Olson & Bear LLP

(57) ABSTRACT

According to one embodiment, a content protection device includes a writing module configured to write protection information into file management information item in order to protect a content which is specified to be protected, wherein the writing module is configured to write the protection information corresponding to sectors which stores content key management information file includes content key link information item includes content key position information item of encrypted content key corresponding to content which is specified to be protected, or to write protection information corresponding to at least part of a sectors which stores content key management file includes encrypted content key corresponding to content which is specified to be protected.

12 Claims, 6 Drawing Sheets

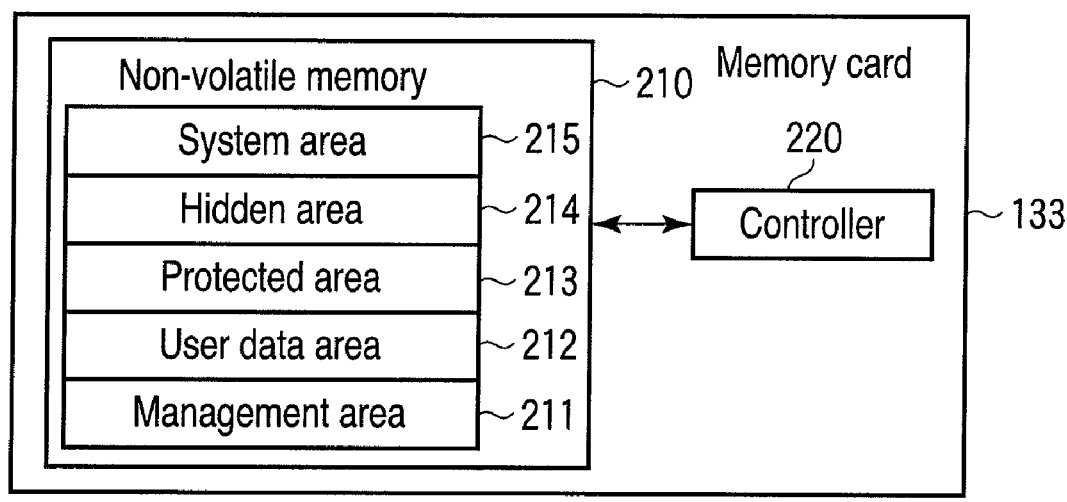
F I G. 2

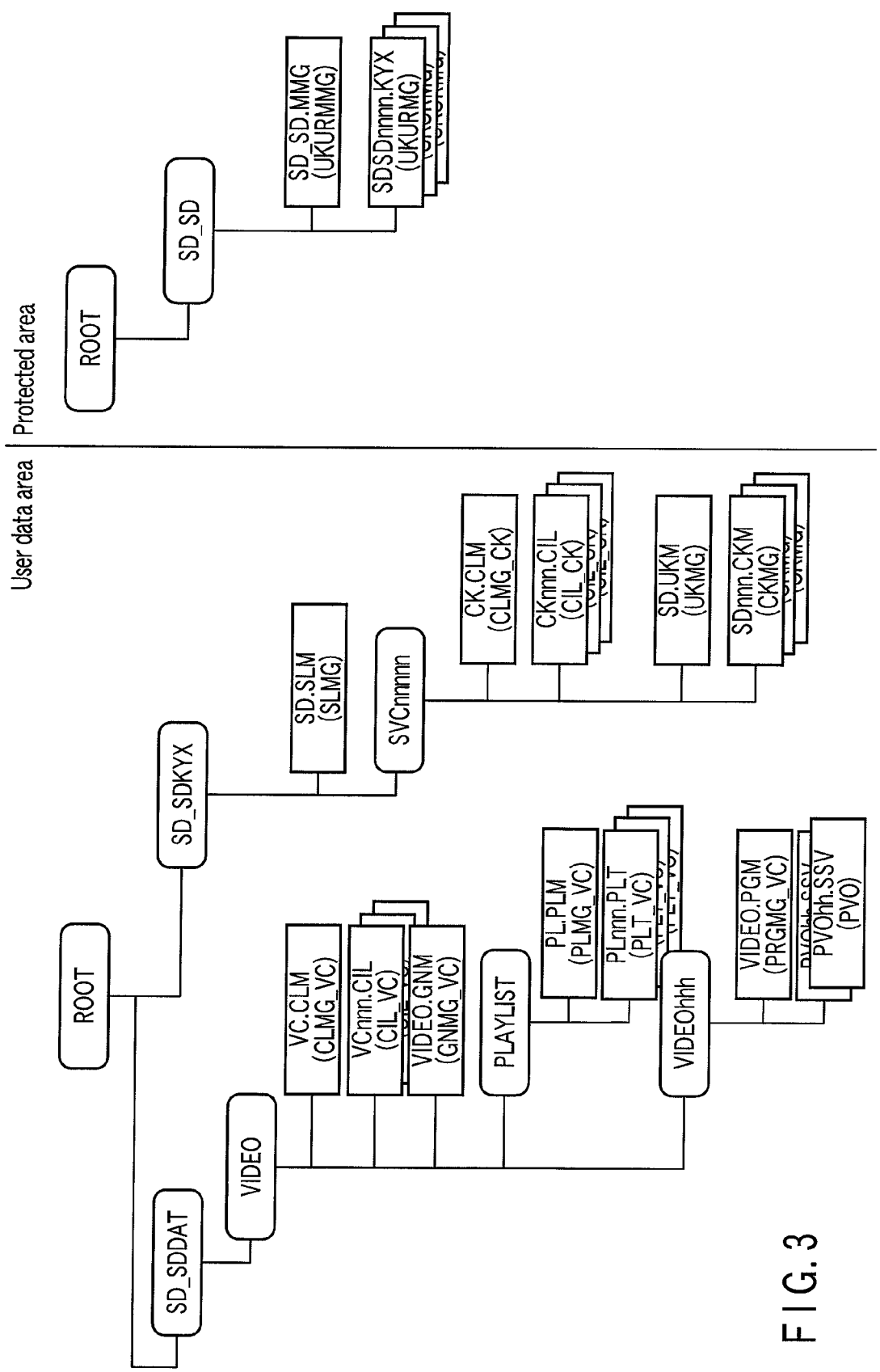
F I G. 3

| CKnnnn.CIL |
|---|
| CII_CK #1 |
| CII_CK #2 |
| CII_CK #3 |
| CII_CK #4 |
| ⋮ |
| CII_CK #N |

FIG. 4

| | |
|---|---|
| n sector | CKMGI |
| | CKI #1 |
| n+1 sector | CKI #2 |
| | CKI #3 |
| n+2 sector | CKI #4 |
| | CKI #5 |
| n+3 sector | CKI #6 |
| | CKI #7 |
| n+4 sector | CKI #8 |
| | CKI #9 |
| n+5 sector | CKI #10 |
| | CKI #11 |
| n+6 sector | CKI #12 |
| | CKI #13 |
| ⋮ | ⋮ |
| | ⋮ |
| n+511 sector | CKI #1022 |
| | CKI #1023 |
| n+512 sector | CKI #1024 |
| | |

CONTENT PROTECTION DEVICE AND CONTENT PROTECTION METHOD

CROSS-REFERENCE TO RELATED APPLICATIONS

This application is based upon and claims the benefit of priority from Japanese Patent Application No. 2009-085881, filed Mar. 31, 2009, the entire contents of which are incorporated herein by reference.

BACKGROUND

1. Field

One embodiment of the invention relates to a content protection device and a content protection method for protecting content recorded in a memory card.

2. Description of the Related Art

SD Card Association sets SD-Separate Delivery (SD-SD) standards. 4C Entity, LLC sets Content Protection for Recordable Media (CPRM) for SD-SD using the SD-SD standards (Nakano Kazunori and two others, "SDconnect Digital Rights Management System Technology Using SD Memory Card", Toshiba review, TOSHIBA CORPORATION, Jul. 1, 2008, Vol. 63, No. 7, p. 31 to 34).

The CPRM for SD-SD prepares a user key and a content key, and records the user key and the content key into a protected area and a user data area, respectively. Content is encrypted with the content key, and the encrypted content is recorded into the user data area or an external storage device. The content key is encrypted with the user key, and the user key is encrypted with a media-specific key specific to an SD memory card. Encrypted content and keys can be dealt with separately from each other owing to the CPRM for SD-SD.

Meanwhile, SD memory cards are often used with portable devices, and are sometimes lost together with portable devices. If a lost portable device is picked up by a third person, there is a risk that the third person may illegally use a content key recorded in the SD card to see content in the SD memory card. Hence, there has been demands for supply of a mechanism which protects contents.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary diagram representing a configuration of a memory card represented in FIG. 1;

FIG. 3 is an exemplary tree view representing a file configuration of SD-SD;

FIG. 4 is an exemplary diagram representing a configuration of a CKnnn.CIL (CIL_CK) file;

FIG. 5 is an exemplary diagram represents a configuration of a SDnnn.CKM (CKMG) file;

FIG. 7A and FIG. 7B are exemplary diagrams for describing another example of the content protection method according to the embodiment of the invention.

DETAILED DESCRIPTION

Figure 1:
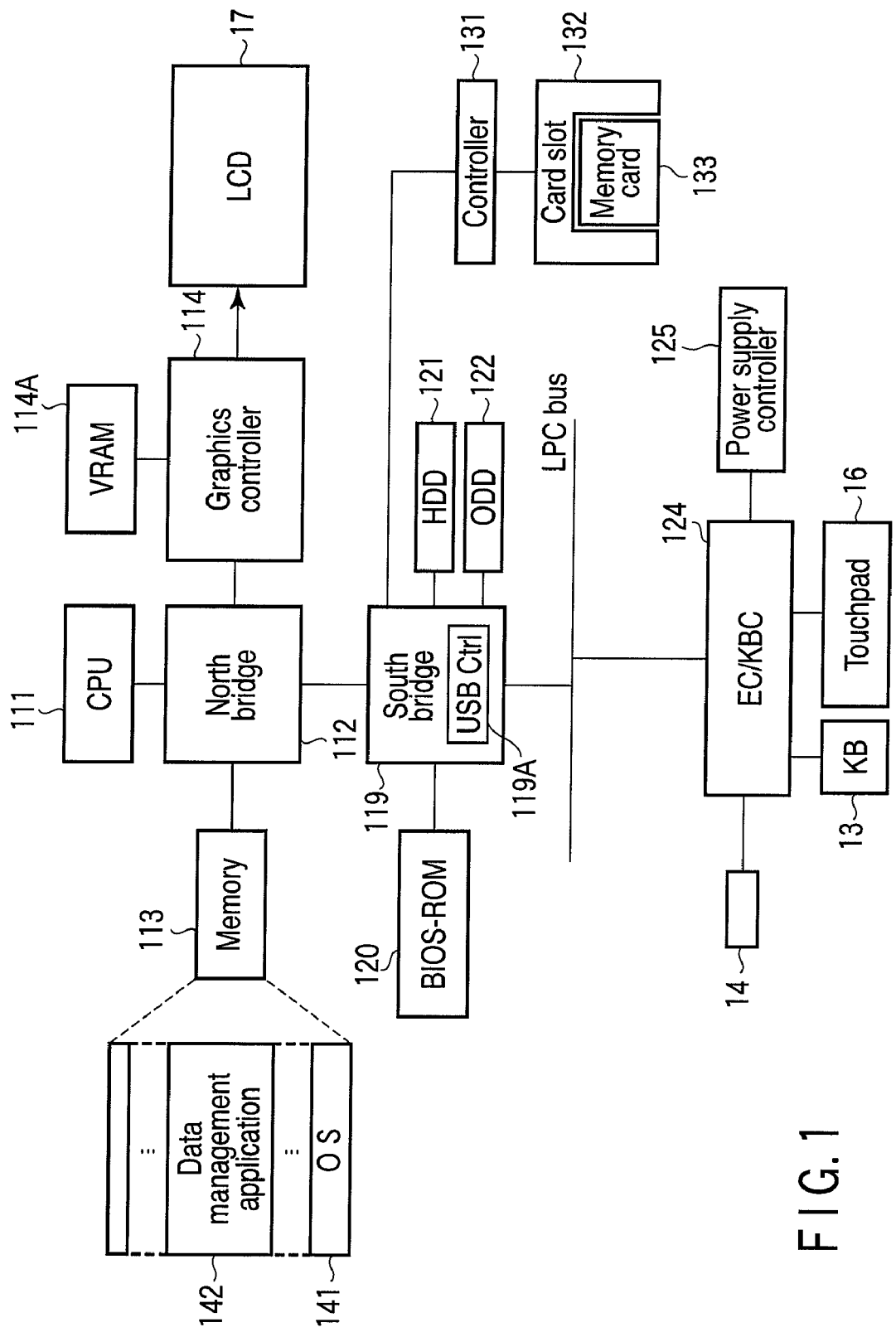
FIG. 1 is an exemplary block diagram representing a system configuration of a content protection device according to an embodiment of the invention.

Various embodiments according to the invention will be described hereinafter with reference to the accompanying drawings. In general, according to one embodiment of the invention, content protection device configured to protect encrypted content stored in a memory card: wherein the memory card comprising a non-volatile memory comprising an user data area, a protected area, a management area, a hidden area, and a system area, wherein the user data area is configured to store an encrypted content item which is obtained by encrypting a content with a content key, a content management file comprising a content information item which associates a content item with a content identifier, a content identifier and content key management file comprising information which associates the content identifier with a content key information item pointing the content key used for encrypting the content associated with the content identifier, a content key management file comprising data areas for storing a content key data item comprising an encrypted content key which is obtained by encrypting the content key with a user key, and a user key position information management file comprising a user key position information item comprising information pointing a user key management file comprising the user key, and information pointing a position of the user key in the user key management file, wherein the user data area is configured to store a content key position information item and content keys link information item, the content key position information item comprises information pointing the content key management file comprising the content key data item comprising the encrypted content key encrypted the content key pointed by the content key information item comprised in the content identifier and content key management file and information pointing position at which the content key data item in the content key management file is stored, and the content keys link information item associates user key position pointer pointing a position in the user key position information management file recorded in the user key position information item corresponding to a user key used for encrypting a content key positioned by the content key information item and stores a content key management information file, wherein the protected area comprising the user key management file comprising a user key and hash values of data items stored in the data areas, wherein the management area configured to store a file management information item for managing files stored in the user data area in units of sectors, the file management information item being capable of storing protection information for each of the sectors, wherein the system area configured to store authentication information; and an authentication module configured to authenticate information input from a host and the authentication information when the host issues a reading command for reading a sector and the file management information item stores protection information corresponding to the sector, and to permit a processing corresponding to the reading command when an authenticating of the information input from the host and the authentication information is successful, the content protection device comprising a writing module configured to write the protection information into the file management information item in order to protect a content which is specified to be protected, wherein the writing module is configured to write the protection information corresponding to sectors which stores the content key management information file comprising the content key link information item comprising the content key position information item of the encrypted content key corresponding to the content which is specified to be protected, or to write the protection information corresponding to at least part of a sectors which stores the content key management file comprising the encrypted content key corresponding to the content which is specified to be protected.

a content protection device configured to protect encrypted content stored in a memory card, comprising: the memory card comprising a non-volatile memory comprising an user data area, a protected area, a management area, a hidden are and a system area, wherein the user data area is configured to store an encrypted content item encrypted a content with a content key, a content management file comprising a content information item which associates a content item with a content identifier given to the content, a content identifier-content key management file comprising information which associates the content identifier with a content key information item pointing the content key used for encrypting the content associated to the content identifier, a content key management file comprising data areas for storing a content key data item comprising an encrypted content key encrypted the content key with a user key, and a user key position information management file comprising a user key position information item comprising information pointing a user key management file comprising the user key with which an encrypted content key has been encrypted, and information pointing a position of the user key in the user key management file, wherein the user data area is configured to store a content key position information item and content keys link information item, the content key position information item comprises information pointing the content key management file comprising the content key data item comprising the encrypted content key encrypted the content key pointed by the content key information item comprised in the content identifier-content key management file and information pointing position at which the content key data item in the content key management file is stored, and the content keys link information item associates user key position pointer pointing a position in the user key position information management file recorded in the user key position information item corresponding to a user key used for encrypting a content key positioned by the content key information item and stores a content key management information file, wherein the protected area comprising the user key management file comprising a user key and hash values of data items stored in the data areas, wherein the management area configured to store a file management information item for managing files stored in the user data area in units of sectors, the file management information item being capable of storing protection information for each of the sectors, wherein the system area configured to store authentication information; and an authentication module configured to authenticate information input from a host and the authentication information when the host issues a reading command for reading a sector and the file management information item stores protection information corresponding to the sector, and to permit a processing corresponding to the reading command when an authenticating of the information input from the host and the authentication information is successful, the content protection device comprising a writing module configured to write the protection information into the file management information item in order to protect a content which is specified to be protected, wherein the writing module is configured to write the protection information corresponding to sectors which stores the content key management information file comprising the content key link information item comprising the content key position information item of the encrypted content key corresponding to the content which is specified to be protected, or to write the protection information corresponding to at least part of a sectors which stores the content key management file comprising the encrypted content key corresponding to the content which is specified to be protected.

Hereinafter, an embodiment of the invention will be described with reference to the drawings.

At first, a configuration of a content protection device according to the embodiment of the invention will be described with reference to FIG. 1. An information processing device in this figure is realized as a portable notebook type personal computer which can be driven by a battery.

As represented in FIG. 1, the computer comprises a keyboard 13, a power button 14, a touchpad 16, a liquid crystal display (LCD) 17, a CPU 111, a north bridge 112, a main memory 113, a graphics controller 114, a south bridge 119, a BIOS-ROM 120, a hard disk drive 121, an embedded controller/keyboard controller IC 124, a power supply controller 125, a host controller 131, a card slot 132, etc.

The CPU 111 is a processor provided for controlling operations of the computer, and executes various application programs, such as an operating system 141 and a memory card data management application program (protection setting means) 142, which are loaded from the hard disk drive 121 to the main memory 113.

The CPU 111 also executes a BIOS program stored in the BIOS-ROM 120. The BIOS program is a program for controlling hardware.

The north bridge 112 is a bridge device which connects between a local bus of the CPU 111 and the south bridge 119. The north bridge 112 includes a memory controller which performs an access control for the main memory 113. The north bridge 112 has a function to make communication with the graphics controller 114 through a PCI Express bus.

The graphics controller 114 is a display controller which controls the LCD 17 used as a display monitor for the computer. The graphics controller 114 comprises a video memory 114A, and generates a video signal to form a display image to be displayed on the LCD 17 in a display unit 12, from display data which is written into the video memory 114A by the OS and/or an application program.

The south bridge 119 controls a device on a LPC bus. Also, the south bridge 119 internally comprises an IDE controller for controlling the HDD 121. Further, the south bridge 119 has a function to perform an access control for the BIOS-ROM 120. Still further, the south bridge 119 comprises a USB controller 119A for controlling data transfer to/from devices which support USB standards.

The host controller 131 is an interface which makes communication with a memory card 133 such as SD memory card. Also, the host controller 131 has a function to make communication with the USB controller 119A. The memory card 133 supports a copyright protection technique. The data management application is software for managing data recorded in the memory card 133.

Next, an internal configuration of the memory card 133 will be described. FIG. 2 is a block diagram which represents the configuration of the memory card.

As represented in FIG. 2, the memory card 133 comprises a non-volatile memory 210 and a controller 220. The non-volatile memory 210 is constituted by, for example, a NAND type flash memory. The controller 220 performs reading/writing of data from/into the non-volatile memory 210 in accordance with commands from the host controller 131. Also, the controller 220 performs an authentication processing concerning a data protection system described later, key exchange, and encrypted communication, and has an encryption/decryption function.

The non-volatile memory 210 comprises a management area 211, a user data area 212, a protected area 213, a hidden area 214, and a system area 215. File management information for managing files in units of sectors is recorded in the management area 211, wherein the files are recorded in the user data area 212, protected area 213, hidden area 214, and system area 215. The file management information is capable of containing flag information indicating protection of data in units of sectors.

If flag information for a sector is "True", data recorded in the sector is protected. Otherwise, in case of "False", the data recorded in the sector is not protected.

If the host commands reading of data from a protected sector in the memory card, the controller 220 performs data protection. The data protection performed by the controller 220 will now be described below. The controller 220 requests input of a password from the host. The controller 220 performs an authentication processing by comparing the password sent from the host with a password stored in the system area. If these two passwords are identical to each other, the controller 220 determines the authentication processing to be successful. Further, the controller 220 performs a processing for transferring data requested by the host to the host.

The system area 215 is a read-only area which is externally accessible from outside of the memory card 133. The hidden area 214 is also a read-only area which is referred to by the memory card 133 itself and is not externally accessible at all. The protected area 213 is externally readable/writable from outside of the memory card 133 if authentication is successful. The user data area 212 is freely externally readable/writable from outside of the memory card 133.

Next, the data protection system of the memory card 133 will be described. When the memory card data management application program 142 is started up, the memory card data management application program 142 displays, on the LCD 17, a list of content items encrypted by a media key stored in the memory card. The user then selects content items which the user desires to protect from the list of content items displayed on the LCD 17. The memory card data management application program 142 protects data corresponding to the content items selected by the user, thereby to forbid decoding of the content items.

The memory card data management application program 142 forbids data, which is required for decoding content items, from being read by the host so that content items may not be decoded. In order to forbid reading of the data required for decoding content items, the memory card data management application program 142 switches, to "True", the flag information in the file management information, for sectors containing the data required for decoding content items.

To describe the data required for decoding content items, a file configuration of the SD-SD will now be described first.

FIG. 3 represents the file configuration of the SD-SD.

A SD_SDDAT directory and a SD_SDKYX directory are provided in ROOT of the user data area. In the SD_SDDAT directory, a VIDEO directory is provided which stores data concerning video content items. In the VIDEO directory, there are provided a VC.CLM (CLMG_VC) file, VCnnn.CIL files (where "nnn" is a three-digit numerical value), a VIDEO.GNM file, a PLAYLIST directory, and VIDEOhhh directories.

The CLMG_VC file (content management file) is to manage video content items. The VCnnn.CIL (CIL_VC) files each describe a list (content information) which associates video content items with content IDs (content identifiers) generated from the video content items, respectively. The VIDEO.GNM (GNMG_VC) file is to manage summaries of video content items.

In the PLAYLIST directory, there are provided a PL.PLM file and PLnnn.PLT files (where "nnn" is a numerical value not smaller than 001). The PL.PLM (PLMG_VC) file is to manage play lists for video contents. The PLnnn.PLT files each describe a play list.

In the VIDEOhhh directory, there are provided a VIDEO.PGM file and PVOhh.SSV files. The VIDEO.PGM file is to manage video contents. The PVOhh.SSV files each are an encrypted video content file.

In the SD_SDKYX directory, there are provided a SD.SLM file and SVCnnnnn directories (where "nnnnn" is a numerical value not smaller than 001). The SD.SLM file describes management information for services.

The SVCnnnnn directories are provided respectively for services. Services respectively corresponding to the SVCnnnnn directories are described in the SD.SLM file. Each of the SVCnnnnn directories stores a CK.CLM (CLMG_CK) file, CKnnn.CIL files (where "nnn" is a numerical value not smaller than 001), a SD.UKM (UKMG) file, and SDnnn.CKM files (where "nnn" is a numerical value).

The CLMG_CK file (content-identifier-content key management file) describes information for managing CIL_CK. The CKnnn.CIL (CIL_CK) files (content key management information files) include plural content key link information items CII_CK #n (where n=1, 2, 3, ..., N). Each of the content key link information items CII_CK #n records information associating, with a content key information item: information pointing a CKMG file including a content identifier key data item including an encrypted content key obtained by encrypting a content key; content key recording position information pointing a recording position of a content key data item in the CKMG file; and a user key recording position pointer pointing a portion where a user key recording position information item pointing a recording position of a user key, with respect to a user key for decoding an encrypted content key in the UKMG file. In each one CKnnn.CIL (CIL_CK) file, content IDs are arranged in an ascending order, and a maximum value of content IDs in one CIL file is smaller than or equal to a minimum value of content IDs in a next CIL file.

The content key is a key used for encrypting a content item. The content key is encrypted and recorded in the user data area. The user key is a key used for encrypting the content key.

The UKMG file (user key information management file) records a user key recording position information item. A recording position of the user key recording position information item for a content item is recorded in the CKnnn.CIL (CIL_CK) files, as described previously.

Each of the SDnnn.CKM files includes data areas CKI_#1 to CKI_#1024 and a CKI management area CKMGI. The data areas CKI_#1 to CKI_#1024 store content key data items. The content key data items each record a usage rule and an encrypted content key obtained by encrypting a content key with a user key. In hash value recording areas UR_HASH in UKURMG files, respectively, hash values of data recorded on the areas CKI_#1 to CKI_#1024 are recorded.

A SD_SD directory is provided on the ROOT of the protected area. In the SD_SD directory, there are provided a SD_SD.MMG (UKURMMG) file and SDSDnnnn.KYX (UKURMG) files. The UKURMMG file describes information for managing the UKURMG files. The UKURMG files (user key management files) each describe hash values of a user key and a content key.

Next, a method for practically applying the method described above for protecting files.

Application Method 1

The first application method is to protect all the SDS-Dnnnn.CKM (CKMG) files subordinate to the SVCnnnnn directory and corresponding to services which have provided content items which have been selected to be protected by the user. That is, the memory card data application program 142 switches flag information for all the sectors that record the SDSDnnnn.KYX (CKMG) files to "True". Since all the SDS-Dnnnn.KYX (CKMG) files are protected by the data protection system, illegal users cannot obtain any content key and can therefore not decode any content item. Thus, content items can be protected.

According to this method, the data protection system protects the CKMG file for each service, and therefore, all the content items in the services are protected.

Application Method 2

According to the second application method, all CKnnn.CIL files subordinate to the SVCnnnnn directory that correspond to services providing content items which have been selected to be protected by the user are protected by the data protection system. That is, the memory card data management application program 142 switches, to "True", flag information for all the sectors that record the CKnnn.CIL files subordinate to the SVCnnnnn directory corresponding to services providing content items which have been selected to be protected by the user.

According to the method described above, illegal users cannot obtain content key link information items since content CIL_CK files which have been specified to be protected are protected. Therefore, no content item is decoded for illegal users, and accordingly, content items can be protected.

In this method, the data protection system protects a CIL_CK file for each service, and therefore, all content items in the services are protected.

Application Method 3

According to the third application method, the entire CKnnn.CIL files including only content items which have been selected to be protected by the user are protected by the data protection system.

If all content items included in one CIL_CK file have been selected to be protected by the user, the entire of the CIL_CK file is protected by the data protection system. If all content items corresponding to an encrypted content key included in one CIL_CK file have not been selected to be protected by the user, the original CIL_CK file is reconstructed into a CIL_CK file which includes content items selected to be protected by the user, and a CIL_CK file which includes content items not selected to be protected by the user. Further, the entire CIL_CK file including the content items selected to be protected by the user is protected by the data protection system.

By referring to CK.CLM (CLMG_CK) files, the memory card data application program 142 refers to the CIL_CK file corresponding to content items selected by the user. Next, if all content items corresponding to content IDs in the CIL_CK file are targets to be protected, the entire CIL_CK file is protected by the data protection system.

If content items related to part of content IDs in the CIL_CK file are targets to be protected, the memory card data management application program 142 reconstructs CIL_CK file so as to extract only selected content items, and protects the reconstructed CIL_CK file by the data protection system.

Figure 6:
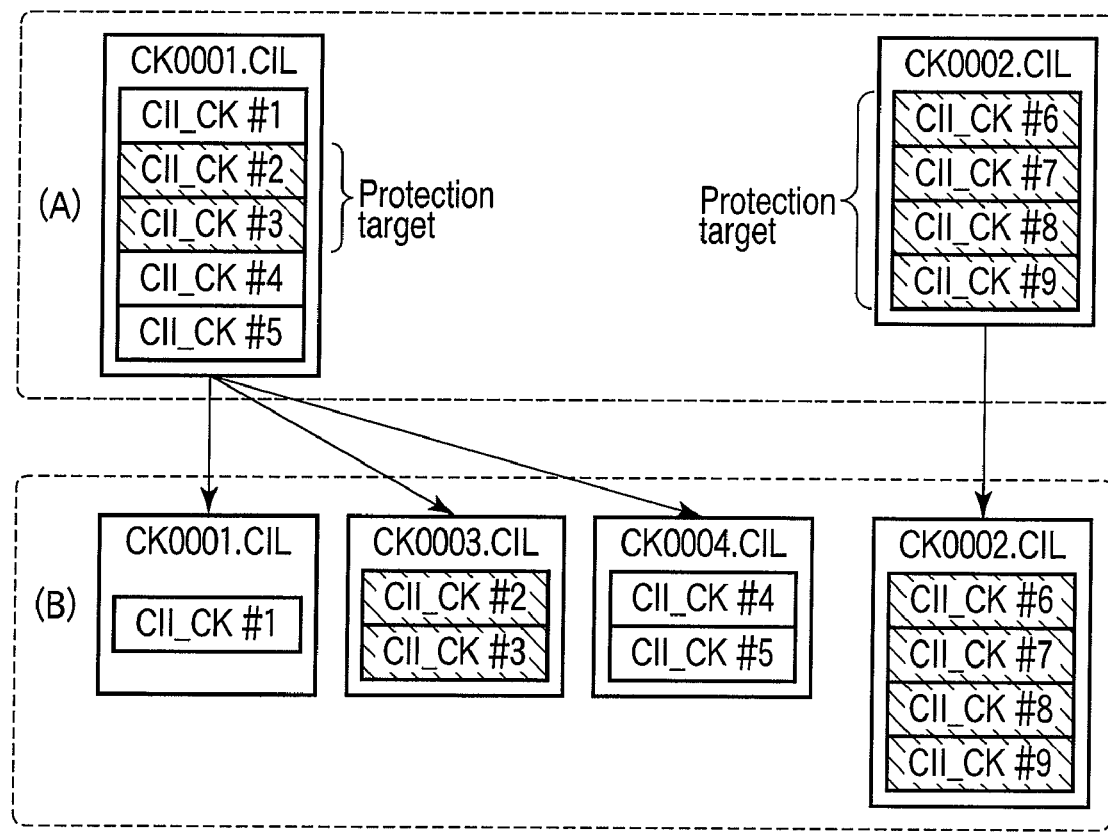
FIG. 6 is an exemplary diagram for describing an example of a content protection method according to the embodiment of the invention.

Outline of this method will now be described with reference to FIG. 6. As represented in FIG. 6A, a CK0001.CIL file and a CK0002.CIL file are stored under the SVCnnnnn directory. The CK0001.CIL file describes content-link information data items CII_CK #1, CII_CK #2, CII_CK #3, CII_CK #4, and CII_CK #5. The CK0002.CIL file describes content-link information data items CII_CK #6, CII_CK #7, CII_CK #8, and CII_CK #9.

The content-link information data items CII_CK #2, CII_CK #3, and CII_CK #6 to #9 are supposed to correspond to content items which have been specified to be protected by the user.

Hence, the memory card data management application program 142 extracts CII_CK #2 and CII_CK #3 from the CK0001.CIL file. The memory card data management application program 142 creates a new CIL_CK file including CII_CK #2 and CII_CK #3. Since the CK0001.CIL file already exists, the memory card data management application program 142 creates a CK0003.CIL file including CII_CK #3, as represented in FIG. 6B. Further, the memory card data management application program 142 switches, to "True", flag information for the sector storing the CII_CK #3.

Meanwhile, after extracting CII_CK #2 and CII_CK #3, numbers assigned to CII_CK #n in the CK0001.CIL file do not follow an ascending order. Under standards, numbers assigned to content-link information data items CII_CK #n in each CIL_CK file need be arranged in an ascending order, and a maximum value of content IDs in one CIL file need be smaller than or equal to a minimum value of content IDs in a next CIL file. Therefore, the memory card data management application program 142 extracts CII_CK #4 and CII_CK #5 from the CK0001.CIL file, and creates a CIL_CK file including CII_CK #4 and CII_CK #5. Since the CK0002.CIL and CK0003.CIL files already exist, the file to be created is named CK0004.CIL, as represented in FIG. 6B.

Since the CIL_CK #6 to CIL_CK #9 files in the CK0002.CIL file all correspond to content items which have been specified to be protected by the user, the CK0002.CIL file is a target to be protected. Therefore, the memory card data management application program 142 switches, to "True", flag information for sectors which record the CK0002.CIL file in the file management information.

According to this method, illegal users cannot obtain content key link information items since the CIL_CK file corresponding to content items specified to be protected are protected. Therefore, illegal users can obtain no content key. Accordingly, content items are not decoded for illegal users, and can thus be protected.

According to this application method, if content-link information data items CII_CK #n corresponding to content items specified to be protected by the user and content-link information data items CII_CK #n corresponding to content items not specified to be protected by the user are mixed in a CIL_CK file, content key link information items CII_CK #n corresponding to content items specified to be protected in the CIL_CK file and content key link information items CII_CK #n corresponding to content items not specified to be protected in the CIL_CK file are respectively extracted, and one or more content key management files are generated, each including the extracted content key link information items in an ascending order. Further, flag information for sectors recording CIL_CK files including only content key link information items CII_CK #n corresponding to content items specified to be protected in the file management information is switched to "True". Thus, a CIL_CK file including only content key link information items CII_CK #n corresponding to content items specified to be protected is generated, and protection is set for the generated CIL_CK file. In this manner, protection can be set for each content.

Application Method 4

The fourth application method will now be described below. According to the fourth application method, CKI data, which describes content keys and usage rules and is stored in a CKMG file, is protected by the data protection system. Meanwhile, protection flags for protecting data are set in units of sectors, and therefore, protected data and non-protected data cannot be mixed in one sector. Hence, in this application method, if protected data and non-protected data are mixed in a sector, the protected data and non-protected data are prevented from being mixed in one sector by moving protected data from the mixed sector to an unused data area. This application method will now be described in more details below.

At first, the user selects content items to protect. Next, the memory card data management application program 142 refers to the CK.CLM file describing content keys and the CKnnn.CIL files, to specify SDnnn.CKM (CKMG) files which store content keys corresponding to the content items selected by the user. The CKMG files each store one or more CKI data items each of which describes a content key and a usage rule.

All CKI data items in the specified CKMG files are targets to be protected, the memory card data management application program 142 protects the entire CKMG files by the data protection system.

Part of CKI data items in the specified CKMG files is a target to be protected, the memory card data management application program 142 determines whether targets to be protected and not to be protected are mixed in each one sector or not. If not mixed, the memory card data management application program 142 protects only sectors as targets to be protected, by the data protection system. Otherwise, if mixed, the memory card data management application program 142 reconstructs the CKMG files so that only the CKI data items as targets to be protected exist in one sector, and only sectors as targets to be protected are protected by the data protection system.

Figures 7A, 7B:
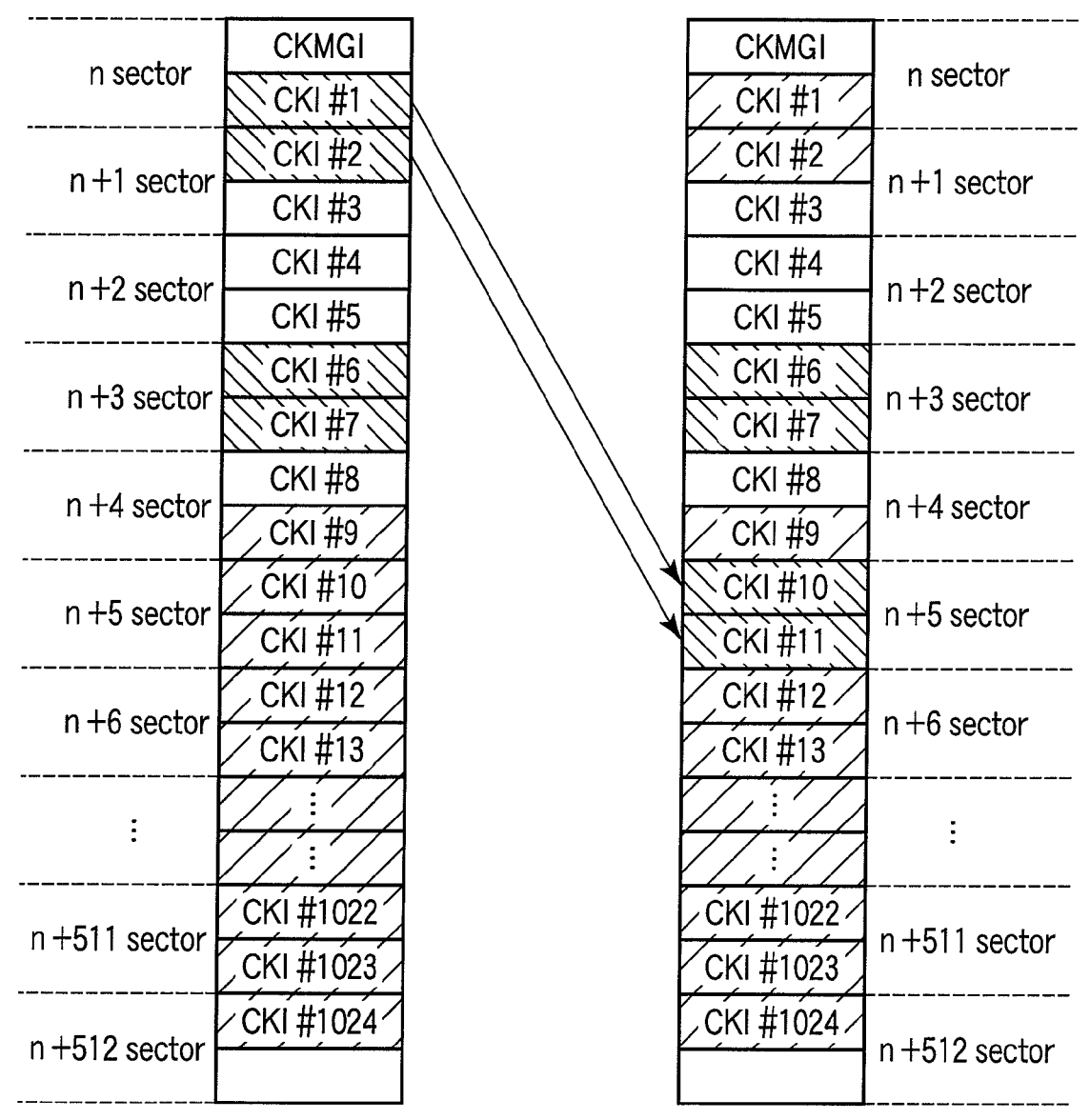

Referring to FIG. 7, the application method 4 will be described. FIG. 7A represents a CKMG file before protection. FIG. 7B represents a protected CKMG file.

A CKMG file maintains a CKI management area CKMGI and data areas CKI_#1 to CKI_#1024. The CKI management area CKMGI records use states of CKI_#1 to CKI_#1024.

As represented in FIG. 7A, the data areas CKI_#9 to CKI_#1024 are unused and describe neither a content key nor a usage rule. The data areas CKI_#1 to CKI_#8 are used areas.

Now, the data areas CKI_#1, CKI_#2, CKI_#6, and CKI #7 are supposed to record content key data items corresponding to contents selected to be protected by the user. The data area CKI_#8 and the data area CKI_#9 are both recorded in the same sector n+3. However, the data area CKI_#1 is recorded in a sector n, and the data area CKI_#2 is recorded in a sector n+1. Thus, the data areas CKI_#1 and #2, which record content key data items corresponding to contents specified to be protected, are recorded in separate sectors, respectively.

Hence, as represented in FIG. 7B, the memory card data management application program 142 moves content key data items recorded in the data area CKI_#1 and CKI_#2 to the data areas CKI_#10 and CKI_#11 which are continuous unused areas, and instead leaves the data areas CKI_#1 and #2 unused. Further, the memory card data management application program 142 calculates hash values of data items recorded in the data areas CKI_#1 to CKI_#1024, and rewrites content of a hash value recording area UR_HASH in the UKURMG file with the calculated hash values. Further, the memory card data management application program 142 switches, to "True", flag information in the file management information for a sector n+5 where the data areas CKI_#10 and CKI_#11 are recorded.

In accordance with the move of content key data items which have been recorded in the data areas CKI_#1 and CKI_#2, the memory card data management application program 142 rewrites content key link information items CIL_CK #n pointing the data areas CKI_#1 and CKI_#2 in the CIL_CK file, with the data areas CKI_#10 and CKI_#11, respectively.

The data areas CKI_#6 and CKI_#7 recording content key data items corresponding to content items specified to be protected are both recorded in the same sector n+3. Therefore, the memory card data management application program 142 switches, to "True", flag information in the file management information for the sector n+3 where the data areas CKI_#6 and CKI_#7 are recorded.

According to this method, data areas including content keys corresponding to content items specified to be protected are protected, and therefore, illegal users cannot obtain a content key. Accordingly, content items are not decoded but can be protected.

According to this application method, if a data area recording a content key data item corresponding to a content item specified to be protected and a data area recording a content key data item CKI #n corresponding to a content item not specified to be protected are mixed in one sector in the CKMG file, the content key data item corresponding to the content item specified to be protected is extracted from the mixed sector. Further, the extracted content key data item is moved in a manner that only content key data items specified to be protected are recorded in each one sector in the CKMG file. Further, information indicating protection is recorded for sectors in the file management information that include content key data items corresponding to content items specified to be protected. In accordance with the move of the content key data item, content key link information items in content key management information files are thereafter rewritten.

Thus, a CIL_CK file including only content key link information items CIL_CK #n corresponding to content items specified to be protected is generated, and the generated CIL_CK file is set protected. In this manner, protection can be set for each content.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content protection device configured to protect encrypted content stored in a memory card:
   wherein the memory card comprises:
   a non-volatile memory comprising a user data area, a protected area, a management area, and a system area, wherein the user data area is configured to store:
an encrypted content obtained by encrypting a content with a content key,
a content management file comprising content information associating a content with a content identifier provided for the content,
a content identifier and content key management file comprising information associating the content identifier with content key information indicative of the content key used for encrypting the content associated with the content identifier,
a content key management file comprising data areas configured to store content key data comprising an encrypted content key which is obtained by encrypting the content key with a user key,
a content key location information management information file comprising content key link information, and
a user key location information management file comprising user key recording location information,
the content key link information comprising content key recording location information corresponding to the content key information and information associating, with the content key information, a user key recording location pointer indicative of a location on which the user key recording location information corresponding to the user key in the user key location information management file is recorded, and
the content key recording location information comprising information indicative of the content key management file comprising the content key data corresponding to the content key information and information indicative of a recording location of the content key data in the content key management file,
wherein the protected area is configured to store a user key management file comprising a user key and hash values of data stored in the data areas in the content key management file,
wherein the management area is configured to store a file management information to manage files in the user data area by sector, the file management information configured to store protection information for each sector,
wherein the system area is configured to store authentication information; and
a controller configured to authenticate with information from a host and the authentication information when the host issues a reading command to a sector and the file management information corresponding to the sector to which the command is issued stores protection information, and to permit the reading when the authentication is successful,
wherein the content protection device comprises a protection setting module which is a recording module configured to record the protection information into the file management information in order to protect a content with protection, wherein the protection setting module is configured to record the protection information on a sector which stores a content key location management information file comprising the content key link information comprising the content key recording location information of the encrypted content key corresponding to the content to be protected, or to record the protection information on at least a portion of sectors comprising the content key management file comprising the encrypted content key corresponding to the content to be protected.

2. The content protection device of claim 1, wherein
the recording module is configured to generate, from the content key management file, a first content key management file comprising content key link information corresponding to a content specified to be protected and a second content key management file comprising content key link information corresponding to a content not specified to be protected, when the content key link information corresponding to the content specified to be protected and the content key link information corresponding to the content not specified to be protected are mixed in the content key management file, and
the recording module is configured to record the protection information for a sector comprising the first content key management file.

3. The content protection device of claim 1, wherein
one sector in the content key management file comprises a plurality of data areas,
the recording module is configured to extract, when a data area comprising content key data corresponding to a content specified to be protected and a data area comprising content key data corresponding to a content not specified to be protected or the hash value are mixed in one sector in the content key management file, the content key data corresponding to the content specified to be protected, from the mixed sector, and to move the extracted content key data in such a manner that the content key data corresponding to the content specified to be protected is recorded in one sector in the content key management file, and
the recording module is configured to record the protection information for the sector comprising the content key data corresponding to the content specified to be protected, in the file management information, and to rewrite content key link information in the content key management file in accordance with movement of the content key data.

4. The content protection device of claim 3, wherein the protection setting module is configured to move the extracted content key data into a sector on which the content key data is not recorded.

5. The content protection device of claim 3, wherein the protection setting module is configured to calculate hash values of data stored in the data areas in the content key management file after the extracted content key data is moved, and to record the calculated hash values in the user key management file.

6. The content protection device of claim 1, wherein the protection setting module is configured to record the protection information for the sector comprising a content key management file comprising an encrypted content key with which a content selected by the user has been encrypted, in the file management information.

7. A content protection method for protecting encrypted content stored in a memory card:
wherein the memory card comprises:
a non-volatile memory comprising a user data area, a protected area, a management area, and a system area,
wherein the user data area is configured to store
an encrypted content obtained by encrypting a content with a content key,
a content management file comprising content information associating a content with a content identifier provided for the content, a content identifier and content key management file comprising information associating the content identifier with content key information indicative of the content key used for encrypting the content associated with the content identifier, a content key management file comprising data areas configured to store content key data comprising an encrypted content key which is obtained by encrypting the content key with a user key, a content key location information management information file comprising content key link information, and a user key location information management file comprising user key recording location information the content key link information comprising content key recording location information corresponding to the content key information and information associating, with the content key information, a user key recording location pointer indicative of a location on which the user key recording location information corresponding to the user key in the user key location information management file is recorded, and the content key recording location information comprising information indicative of the content key management file comprising content key data corresponding to the content key information and information indicative of a recording location of the content key data in the content key management file, wherein the protected area is configured to store a user key management file comprising a user key and hash values of data stored in the data areas in the content key management file, wherein the management area is configured to store file management information to manage files in the user data area by sector, the file management information configured to store protection information for each sector, wherein the system area is configured to store authentication information; and a module configured to authenticate with information from a host and the authentication information when the host issues a reading command to a sector and the file management information corresponding to the sector to which the command is issued stores protection information, and to permit the reading when the authentication is successful, wherein the content protection method comprising:

recording the protection information corresponding to a sector comprising the content key management file comprising the content key link information comprising the content key recording location information of the encrypted content key corresponding to a content to be protected, or recording the protection information on at least a portion of sectors comprising the content key management file comprising the encrypted content key obtained by encrypting the content to be protected.

8. The content protection method of claim 7, further comprising:

generating, from the content key management file, a first content key management file comprising content key link information corresponding to a content specified to be protected and a second content key management file comprising content key link information corresponding to a content not specified to be protected, when the content key link information corresponding to the content specified to be protected and the content key link information corresponding to the content not specified to be protected are mixed in the content key management file; and recording the protection information for a sector comprising the first content key management file.

9. The content protection method of claim 7, wherein one sector in the content key management file comprises a plurality of data areas, the content protection method further comprising:

extracting, when a data area comprising content key data corresponding to a content specified to be protected and a data area comprising content key data corresponding to a content not specified to be protected or the hash values are mixed in one sector in the content key management file, the content key data corresponding to the content specified to be protected, from the mixed sector;

moving the extracted content key data in such a manner that the content key data corresponding to the content specified to be protected is recorded in one sector in the content key management file;

recording the protection information for a sector comprising the content key data corresponding to the content specified to be protected, in the file management information; and rewriting content key link information in the content key management information file in accordance with the movement of the content key data.

10. The content protection method of claim 9, further comprising moving the extracted content key data into a sector on which the content key data is not recorded.

11. The content protection method of claim 9, further comprising calculating hash values of data stored in the data areas in the content key management file after the extracted content key data is moved, and recording the calculated hash values in the user key management file.

12. The content protection method of claim 7, further comprising recording the protection information for a sector comprising a content key management file comprising an encrypted content key with which a content selected by the user has been encrypted, in the file management information item.

* * * * *